(12) United States Patent
Verma et al.

(10) Patent No.: US 11,057,174 B2
(45) Date of Patent: Jul. 6, 2021

(54) WIRELESS COMMUNICATION WITH PARTIAL CHANNEL PUNCTURING

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Lin Yang, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 16/219,456

(22) Filed: Dec. 13, 2018

(65) Prior Publication Data

US 2019/0199491 A1 Jun. 27, 2019

Related U.S. Application Data

(60) Provisional application No. 62/610,115, filed on Dec. 22, 2017.

(51) Int. Cl.
*H04L 5/00* (2006.01)
*H04W 72/04* (2009.01)
(Continued)

(52) U.S. Cl.
CPC .......... *H04L 5/0046* (2013.01); *H04L 1/0069* (2013.01); *H04L 5/0032* (2013.01);
(Continued)

(58) Field of Classification Search
None
See application file for complete search history.

(56) References Cited

U.S. PATENT DOCUMENTS

| 2014/0274103 | A1 | 9/2014 | Steer et al. | |
| 2017/0202020 | A1* | 7/2017 | Cherian | H04L 5/0053 |
| 2018/0092123 | A1* | 3/2018 | Liu | H04L 5/0094 |

FOREIGN PATENT DOCUMENTS

| EP | 3185604 | | 6/2017 | | |
| WO | WO-2018013139 | A1 * | 1/2018 | ............ | H04W 76/15 |
| WO | WO-2018152224 | A1 * | 8/2018 | ............... | H04L 1/00 |

OTHER PUBLICATIONS

Foreign Priority Document obtained from WIPO for WO 2018/152224A1—U.S. Appl. No. 62/459,328 (Year: 2018).*

(Continued)

*Primary Examiner* — Robert M Morlan
(74) *Attorney, Agent, or Firm* — DeLizio Law, PLLC; Kevin M. Donnelly

(57) ABSTRACT

This disclosure provides systems, methods, and apparatus, including computer programs encoded on computer-readable media, for wireless communication with partial channel puncturing. Using partial channel puncturing, a wireless local area network (WLAN) device may modulate data on a first portion of a wireless channel while refraining from modulating data on a second portion of the wireless channel. The partial channel puncturing can be used with an exclusion bandwidth zone defined for the WLAN. The exclusion bandwidth zone prevents transmissions on portions of channels so that the WLAN transmissions do not interfere with an incumbent system transmission in the exclusion bandwidth zone.

20 Claims, 14 Drawing Sheets

(51) Int. Cl.
*H04L 1/00* (2006.01)
*H04W 74/08* (2009.01)
*H04W 16/14* (2009.01)

(52) U.S. Cl.
CPC ....... *H04L 5/0041* (2013.01); *H04W 72/0453* (2013.01); *H04W 74/08* (2013.01); *H04W 16/14* (2013.01)

(56) References Cited

OTHER PUBLICATIONS

"PCT Application No. PCT/US2018/065808 International Search Report and Written Opinion", dated Mar. 7, 2019, 11 pages.

* cited by examiner

WIRELESS COMMUNICATION WITH PARTIAL CHANNEL PUNCTURING

CROSS-REFERENCE TO RELATED APPLICATIONS

This patent application claims priority to U.S. Provisional Patent Application No. 62/610,115 filed Dec. 22, 2017, entitled "WIRELESS COMMUNICATION WITH PARTIAL CHANNEL PUNCTURING," and assigned to the assignee hereof. The disclosure of the prior application is considered part of and is incorporated by reference in this patent application.

TECHNICAL FIELD

This disclosure relates to the field of network communication, and more particularly to wireless communication in an unlicensed frequency band.

DESCRIPTION OF THE RELATED TECHNOLOGY

Wireless communication technologies may use unlicensed frequency bands which permit a variety of devices to transmit wireless communication signals. Examples of unlicensed frequency bands may include 2.4 GHz frequency band (sometimes also referred to as an "industrial, scientific, and medical" or "ISM" frequency band) and a 5 GHz frequency band (sometimes also referred to as an "Unlicensed National Information Infrastructure" or "UNII" frequency band). Technology specifications are being drafted for a 6 GHz frequency band. The 6 GHz frequency band may support the Institute of Electrical and Electronics Engineers (IEEE) 802.11 standard for communication as well as other wireless technologies. The 6 GHz band is expected to be an unlicensed frequency band which is open for operation by newer access points (APs) and stations (STAs). For example, the 6 GHz band may be used by newer IEEE 802.11 devices.

The proposed 6 GHz unlicensed frequency band may be used by devices having different technology types. For example, in addition to IEEE 802.11 devices, the spectrum could be used by other technologies. One example of another technology being proposed is Long Term Evolution (LTE) for unlicensed spectrum which is being developed by the 3rd Generation Partnership Project (3GPP) standards-setting body. Other technologies may utilize the 6 GHz unlicensed frequency band, including Bluetooth™, satellite, radar, terrestrial radio, cellular signals, or other technologies. To share the spectrum, one system (such as IEEE 802.11) should avoid transmitting in frequencies that are being used by an incumbent system. Current techniques for avoiding an incumbent system may be too restrictive. An enhanced transmission scheme may increase bandwidth and performance of IEEE 802.11 transmissions while concurrently avoiding frequencies used by an incumbent system.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method performed by a wireless local area network (WLAN) device. The WLAN device may determine a group of channels for a wireless transmission. The group of channels including at least a first channel and a second channel. The WLAN device may determine that a first portion of the first channel overlaps a first bandwidth exclusion zone and that a second portion of the first channel does not overlap the first bandwidth exclusion zone. The WLAN device may transmit the wireless transmission via the group of channels. At least part of wireless transmission may utilize the second portion of the first channel that does not overlap the first bandwidth exclusion zone.

In some implementations, transmitting the wireless transmission may include puncturing a transmission signal at portions of channels that are excluded by one or more bandwidth exclusion zones.

In some implementations, transmitting the wireless transmission may include transmitting a transmission signal that occupies non-excluded portions of the channels in the group of channels.

In some implementations, the group of channels may represent a subset of channels that are defined by a channel map.

In some implementations, the channel map may specify 20 MHz ranges for each channel. The group of channels may permit larger frequency ranges for higher throughput transmissions.

In some implementations, the method may include, before transmitting the wireless transmission, receiving a bandwidth exclusion zone list that includes at least the first bandwidth exclusion zone from an access point of a wireless network.

In some implementations, the method may include, before transmitting the wireless transmission, determining that a recipient of the wireless transmission is capable of receiving the wireless transmission with partial channel puncturing.

In some implementations, the method may include sending or receiving a capability indicator in a management frame. The capability indicator may indicate support for partial channel puncturing.

In some implementations, transmitting the wireless transmission may include duplicating a pre-EHT (Extremely High Throughput) modulated portion on channels in the group of channels that do not overlap the first bandwidth exclusion zone.

In some implementations, transmitting the wireless transmission may include receiving an excitation frame (such as a trigger frame). The method may include determining that a receiving device supports partial channel puncturing and supports omission of a pre-EHT modulated portion. The method may include transmitting the wireless transmission using partial channel puncturing on the group of channels and without the pre-EHT modulated portion.

In some implementations, the method may include, before transmitting the wireless transmission, determining one or more amounts of detected energy at one or more portions of the group of channels. The method may include performing a clear channel assessment based, at least in part, on the one or more amounts of detected energy. The method may include determining to transmit the wireless transmission if the clear channel assessment indicates that the group of channels are available for the wireless transmission.

In some implementations, determining the one or more amounts of detected energy may include determining a first amount of detected energy at a primary channel of the group of channels. The clear channel assessment may be based on the first amount of detected energy at the primary channel.

In some implementations, the primary channel may be selected in coordination with a recipient of the wireless transmission, and the primary channel may not overlap with any bandwidth exclusion zones.

In some implementations, the method may include determining the one or more amounts of detected energy on a per-channel basis for a subset of channels in the group of channels, the subset of channels including channels that do not overlap with any bandwidth exclusion zones.

In some implementations, the subset of channels may include at least one adjacent channel next to the first channel having the first portion of the first channel overlaps the first bandwidth exclusion zone.

In some implementations, determining the one or more amounts of detected energy may include defining a sub-channel measurement bandwidth and determining multiple measurements of amounts of detected energy for at least the first channel of the group of channels. In some implementations, performing the clear channel assessment may include determining whether the first portion of the first channel is available for the wireless transmission.

In some implementations, determining the one or more amounts of detected energy may include determining measurements of amounts of detected energy for each sub-channel measurement bandwidth of all channels of the group of channels.

In some implementations, the group of channels may include a third channel and a fourth channel. In some implementations, the method may include preparing the wireless transmission using partial channel puncturing such that the wireless transmission will not occupy portions of channels in the group of channels that overlap with the first bandwidth exclusion zone. In some implementations, the method may include transmitting the wireless transmission via the group of channels.

In some implementations, the method may include determining a second bandwidth exclusion zone that at least partially overlaps a frequency range associated with the group of channels. In some implementations, the method may include preparing the wireless transmission using partial channel puncturing such that the wireless transmission will not occupy portions of channels in the group of channels that overlap with the second bandwidth exclusion zone. And the method may include transmitting the wireless transmission via the group of channels.

Another innovative aspect of the subject matter described in this disclosure can be implemented in a WLAN apparatus. In some implementations, the WLAN apparatus includes at least one interface and at least one processor. The processor may be configured to determine a group of channels for a wireless transmission, the group of channels including at least a first channel and a second channel. The processor may be configured to determine that a first portion of the first channel overlaps a first bandwidth exclusion zone and that a second portion of the first channel does not overlap the first bandwidth exclusion zone. The processor may be configured to cause the interface to transmit the wireless transmission via the group of channels, wherein at least part of wireless transmission utilizes the second portion of the first channel that does not overlap the first bandwidth exclusion zone.

In some implementations, the processor may be configured to puncture a transmission signal at portions of channels that are excluded by one or more bandwidth exclusion zones.

In some implementations, the processor may be configured to cause the interface to transmit a transmission signal that occupies non-excluded portions of channels in the group of channels.

In some implementations, the group of channels represents a subset of channels that are defined by a channel map.

In some implementations, the channel map specifies 20 MHz ranges for each channel, and wherein the group of channels permit larger frequency ranges for higher throughput transmissions.

In some implementations, the processor may be configured to, before causing the interface to transmit the wireless transmission, receive a bandwidth exclusion zone list that includes at least the first bandwidth exclusion zone from an access point of a wireless network.

In some implementations, the processor may be configured to, before causing the interface to transmit the wireless transmission, determine that a recipient of the wireless transmission is capable of receiving the wireless transmission with partial channel puncturing.

In some implementations, the processor may be configured to send or receive a capability indicator in a management frame, the capability indicator for indicating support for partial channel puncturing.

In some implementations, the processor may be configured receive an excitation frame, determine that a receiving device supports partial channel puncturing and supports omission of a pre-EHT modulated portion, and cause the interface to transmit the wireless transmission using partial channel puncturing on the group of channels and without the pre-EHT modulated portion.

In some implementations, the processor may be configured to, before causing the interface to transmit the wireless transmission, determine one or more amounts of detected energy at one or more portions of the group of channels. In some implementations, the processor may be configured perform a clear channel assessment based, at least in part, on the one or more amounts of detected energy, determine to transmit the wireless transmission if the clear channel assessment indicates that the group of channels are available for the wireless transmission.

In some implementations, the processor may be configured to determine a first amount of detected energy at a primary channel of the group of channels, wherein the clear channel assessment is based on the first amount of detected energy at the primary channel.

In some implementations, the primary channel is selected in coordination with a recipient of the wireless transmission, and the primary channel does not overlap with any bandwidth exclusion zones.

In some implementations, the processor may be configured determine the one or more amounts of detected energy on a per-channel basis for a subset of channels in the group of channels, the subset of channels including channels that do not overlap with any bandwidth exclusion zones.

In some implementations, the subset of channels includes at least one adjacent channel next to the first channel having the first portion of the first channel overlaps the first bandwidth exclusion zone.

Another innovative aspect of the subject matter described in this disclosure can be implemented as an electronic device having an interface and a processor. The processor may be configured to determine a group of channels for a wireless transmission, the group of channels including at least a first channel and a second channel. The processor may be configured to determine that a first portion of the first channel overlaps a first bandwidth exclusion zone and that a second portion of the first channel does not overlap the first bandwidth exclusion zone. The processor may be configured to cause the interface to transmit the wireless transmission via the group of channels, wherein at least part of wireless transmission utilizes the second portion of the first channel that does not overlap the first bandwidth exclusion zone. The electronic device may have one or more antennas coupled to the at least one interface to wirelessly transmit signals output from the interface and to wirelessly receive signals for input into the interface. The electronic device may have a housing that encompasses the processor and at least a portion of the one or more antennas.

Another innovative aspect of the subject matter described in this disclosure can be implemented a system having means for determining a group of channels for a wireless transmission, the group of channels including at least a first channel and a second channel. The system may include means for determining that a first portion of the first channel overlaps a first bandwidth exclusion zone and that a second portion of the first channel does not overlap the first bandwidth exclusion zone. The system may include means for transmitting the wireless transmission via the group of channels, wherein at least part of wireless transmission utilizes the second portion of the first channel that does not overlap the first bandwidth exclusion zone.

Another innovative aspect of the subject matter described in this disclosure can be implemented in a tangible computer-readable storage medium comprising non-transitory processor-executable code which, when executed by at least one processor of a WLAN apparatus, causes the WLAN apparatus to determine a group of channels for a wireless transmission, the group of channels including at least a first channel and a second channel. The non-transitory processor-executable code, when executed by the processor, may cause the WLAN apparatus to determine that a first portion of the first channel overlaps a first bandwidth exclusion zone and that a second portion of the first channel does not overlap the first bandwidth exclusion zone. The non-transitory processor-executable code, when executed by the processor, may cause the WLAN apparatus to transmit the wireless transmission via the group of channels, wherein at least part of wireless transmission utilizes the second portion of the first channel that does not overlap the first bandwidth exclusion zone.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
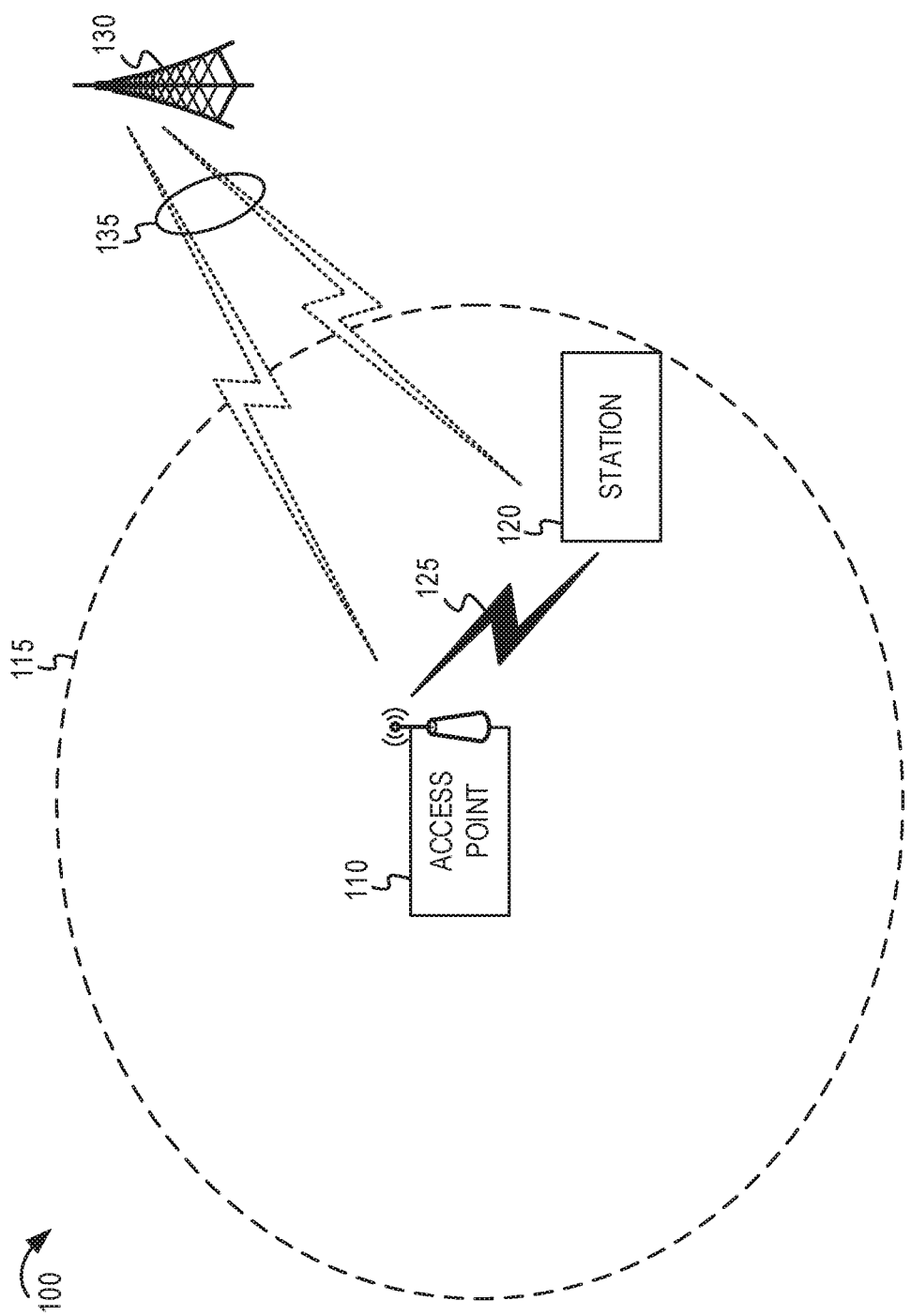
FIG. 1 depicts a system diagram of an example network operating in an unlicensed frequency band.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any wireless communication standards, including any of the Institute of Electrical and Electronics Engineers (IEEE) 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

The concepts in this disclosure may be used with any unlicensed frequency band (or collection of unlicensed frequency bands). However, for brevity, this disclosure uses the 6 GHz unlicensed frequency band as an example for several of the Figures. Furthermore, this disclosure includes descriptions of IEEE 802.11 devices as an example. However, the techniques in this disclosure may be used with any wireless technology which can utilize combined channels. For brevity, this disclosure may describe enhanced IEEE 802.11ax or later generation IEEE devices which can transmit higher throughput by modulating data over a combined channel group consisting of multiple 20 MHz channels. The IEEE 802.11 network and related devices may be referred to as a wireless local area network (WLAN) in this disclosure.

As described above, the 6 GHz frequency band is expected to be shared by a plurality of wireless communication systems. For brevity, this disclosure will describe a WLAN which is being operated in the 6 GHz frequency band that already has signals from other incumbent technologies (such as satellite, fixed microwave, or the like). The bandwidth occupied by the incumbent technology may be described as an exclusion bandwidth zone (which also may be referred to as an "Exclusion BW Zone"). In the various examples of this disclosure, one Exclusion BW Zone is described. However, there may be multiple Exclusion BW Zones that overlap channels in the 6 GHz frequency band. The devices of the WLAN should refrain from transmitting signals on the frequencies listed in the Exclusion BW Zone. There are many techniques for WLAN devices to be made aware of the Exclusion BW Zones operating in the 6 GHz frequency band in the geographic area of the WLAN. For example, an access point (AP) may inform the stations (STAs) of the Exclusion BW Zones. The Exclusion BW Zones may be pre-defined or may be detected during operation of the WLAN devices. The Exclusion BW Zones may be indicated in an Exclusion BW Zone list that is communicated to (or retrieved by) the WLAN devices.

WLAN devices operating in the 6 GHz band also are aware of the channel map for the frequency band. The channel map may include a list of operating channels, in which each channel is 20 MHz width increments. The IEEE 802.11 standard typically relies on 20 MHz channel sizes as a lowest increment of channel size. As WLAN technology has developed, it is possible for WLAN devices to combine channels into a group of channels for higher bandwidth transmissions. For example, IEEE 802.11n described the use of 2 channels (for a combined 40 MHz bandwidth) and defined a High Throughput (HT) transmission format. IEEE 802.11ac described the use of 8 channels (for a combined 160 MHz bandwidth) and defined a Very High Throughput (VHT) transmission format. IEEE 802.11ax also supports a combined 160 MHz bandwidth (which is a combination of 8 channels of 20 MHz width each). In IEEE 802.11ax, a transmission format may spread High Efficiency (HE) modulated symbols throughout the combined channel group. Later generations of IEEE 802.11 may increase the quantity of channels and techniques for modulating data via a group of channels. For example, Extremely High Throughput (EHT, which also may be referred to as XHT) may support 320 MHz channel groups (with 16 spatial streams) and enhanced modulation techniques. In several examples in this disclosure, techniques may be described in relation to EHT transmission format. However, the described concepts may be used by other transmission formats.

WLAN devices may be capable of avoiding (using full channel puncturing) those channels that are occupied by an Exclusion BW Zone. Full channel puncturing means that the entire channel (from within the group of channels) is zeroed out and that no preamble or data is transmitted on the subcarriers belonging to the punctured channel. Because the channel map for IEEE 802.11 devices has relied on 20 MHz channel sizing, the previous techniques for avoiding an Exclusion BW zone may be inefficient. For example, the Exclusion BW Zone may be a different size (such as smaller) than the 20 MHz channel size. Furthermore, the Exclusion BW Zone boundaries may not align with the 20 MHz channel boundaries.

In accordance with this disclosure, a WLAN device may utilize partial channel puncturing (which also may be referred to as "sub-20 MHz puncturing"). This disclosure describes how channels can be partially punctured, while still transmitting modulated data (such as HE or EHT modulated signals) using a portion of a channel that is not affected by an Exclusion BW Zone. A packet format and channel utilization technique are described to accommodate partial channel puncturing. For example, depending on whether a wireless transmission has been triggered or non-triggered, a transmitting WLAN device may omit preambles on some punctured channels while still modulating data on a portion of the punctured channel. Several techniques are described for clear channel assessment (CCA) so that a transmitting device can determine whether the channel is available for transmission.

Particular implementations of the subject matter described in this disclosure can be implemented to realize one or more of the following potential advantages. Higher throughput may be achieved in the 6 GHz frequency band because portions of channels which were previously unavailable may become available for transmissions. Channel access may become more efficient through the use of CCA techniques that accommodate partial channel access. In some implementations, legacy preambles (such as pre-EHT modulated portions of an EHT transmission packet) may be omitted, which reduces the overhead associated with high throughput transmissions on combined channel groups.

FIG. 1 depicts a system diagram of an example network operating in an unlicensed frequency band. The system diagram 100 includes an access point (AP) 110 which has a wireless connection 125 to a station (STA) 120. The AP 110 and STA 120 may form a WLAN. The AP 110 and STA 120 are examples of a WLAN apparatus. In some implementations, a WLAN in a home, apartment, business, or another area may include multiple APs (not shown). The WLAN also may be communicatively coupled to a broadband network (not shown) and may enable STAs wirelessly coupled to an AP to access the broadband network. For example, a gateway device (such as a central AP or router) can couple to the broadband network through a cable, a fiber optic, a power line, or DSL network connection. In other deployments, there may be multiple APs within an environment which are related to different WLANs. The multiple APs may each operate on one or more operating channels within an unlicensed frequency band. A channel may refer to a portion of the unlicensed frequency band. Each channel may have a pre-defined central frequency and channel width (such as 20 MHz channel width). Some APs are capable of determining which operating channels are least congested and establish itself on selected operating channels. The AP 110 may provide a coverage range 115 for STAs within that coverage range 115 to communicate with the AP 110.

The system diagram 100 also shows an incumbent system which may be transmitting in part of the unlicensed frequency band. In the system diagram 100, a base station 130 (such as an eNodeB or Home eNodeB using LTE) may be transmitting incumbent wireless signals 135. So that the AP 110 and STA 120 do not interfere with the incumbent wireless signals 135, the wireless connection 125 may be configured so that it does not use frequencies that overlap with the incumbent wireless signals 135. The frequencies which are avoided may be defined as an Exclusion BW Zone. The capability of the AP 110 and STA 120 to utilize combined channels for higher throughput (as well as the relationship of the Exclusion BW Zone to the combined channels) is further described in FIG. 2.

Figure 2:
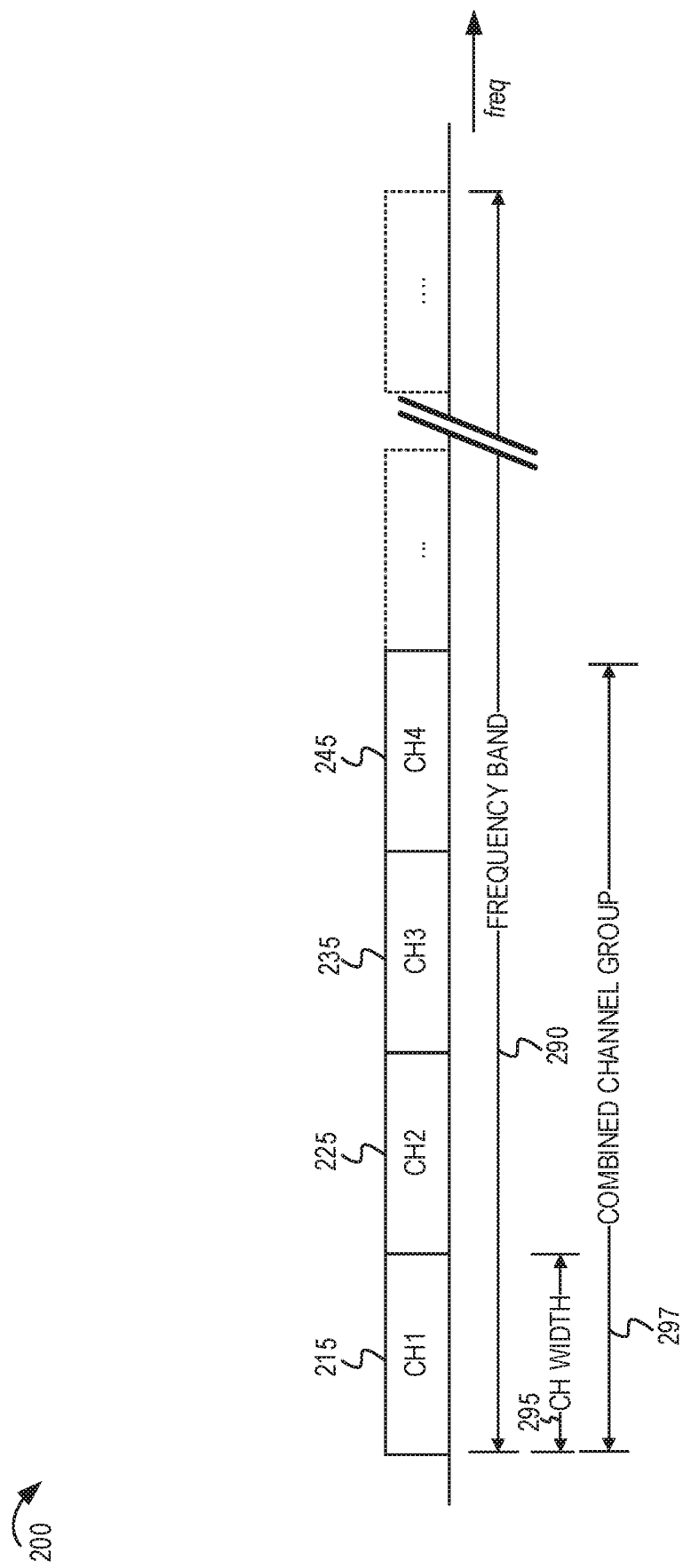
FIG. 2 depicts an example use of multiple channels in an unlicensed frequency band.

FIG. 2 depicts the use of multiple channels in an unlicensed frequency band. In FIG. 2, a channel map 200 for a frequency band 290 (such as the 6 GHz unlicensed frequency band) may define multiple channels. In the example of FIG. 2, each channel has a uniform channel width 295 (such as 20 MHz). As described above, some WLAN devices are capable of transmitting higher bandwidth by concurrently using multiple channels. In the example of FIG. 2, an 80 MHz transmission may utilize a combined channel group 297 which is a group of four channels (a first channel 215, a second channel 225, a third channel 235, and a fourth channel 245). In some references, a combined channel group 297 also may be referred to as bonding multiple channels. Although depicted as contiguous channels in the channel map, in some implementations, the combined channel group 297 may contain channels which are not adjacent in the channel map. For the remaining descriptions of high throughput transmissions, this disclosure will rely on the group of four channels as described in FIG. 2. However, larger groups of channels may be used in some implementations. For example, IEEE 802.11ax provides for the use of 8 channels, and later versions of IEEE 802.11 may provide for the use of 16 (or more) channels for higher bandwidth transmissions.

Figure 3:
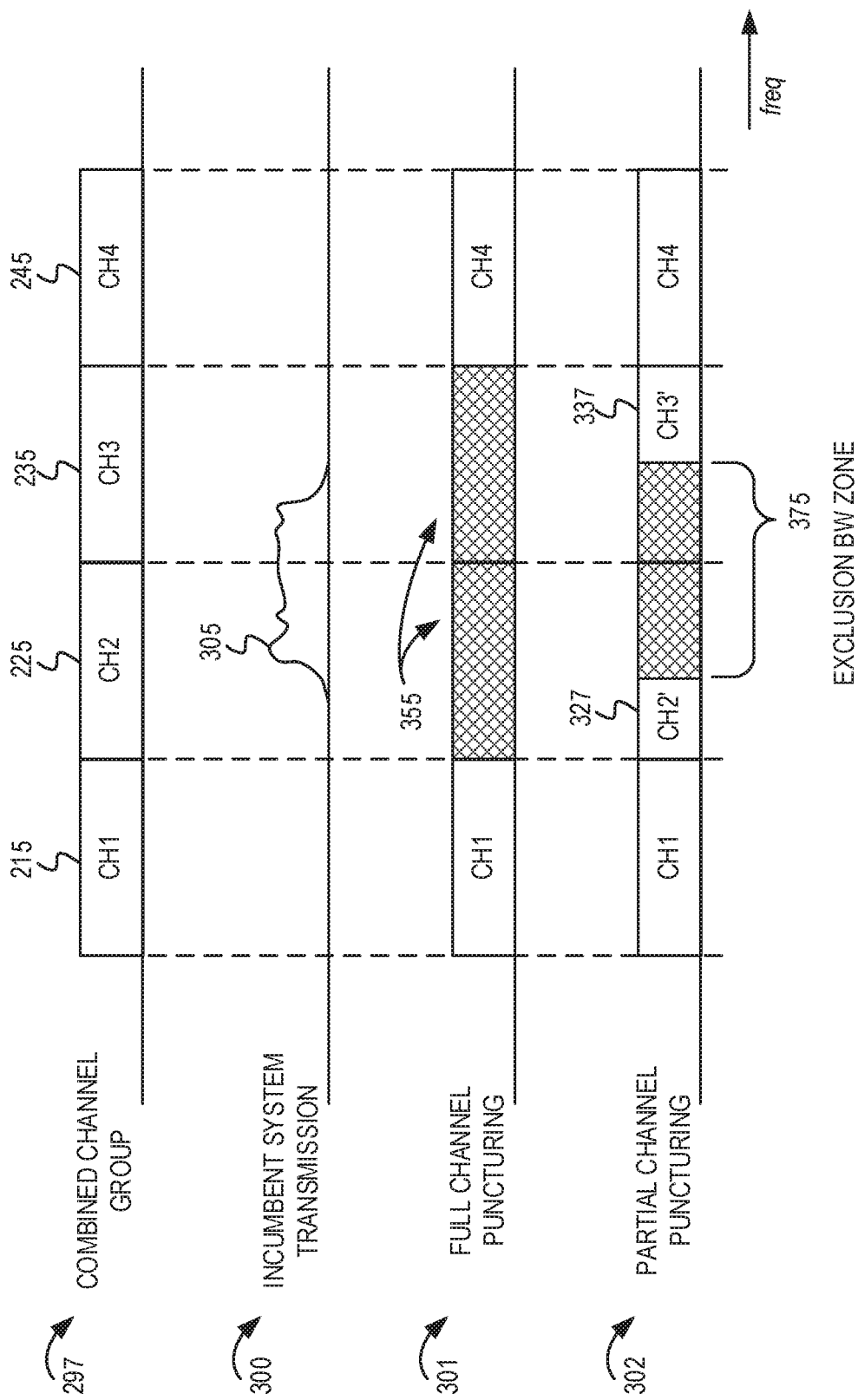
FIG. 3 depicts an example incumbent system transmission and associated channel puncturing.

FIG. 3 depicts an example incumbent system transmission and associated channel puncturing. The combined channel group 297 shows the group of four channels (the first channel 215, the second channel 225, the third channel 235, and the fourth channel 245) which serves as the starting point for a high throughput transmission. For example, referring to FIG. 1, the STA 120 may be allocated the four channels by the AP 110 for an upstream transmission from the STA 120 to the AP 110.

However, the STA 120 may not be able to use the full 80 MHz bandwidth because of an incumbent system transmission 305. FIG. 3 shows the incumbent system transmission 305 in a frequency line graph 300 that is aligned with the combined channel group 297 for visual purposes. It can be seen that the incumbent system transmission 305 occupies part of the frequency ranges associated with the second channel 225 and the third channel 235. To avoid transmitting in the same frequency range as the incumbent system transmission 305, a traditional WLAN device may utilize full channel puncturing (as shown in the frequency line graph 301). In full channel puncturing, the WLAN device would refrain from transmitting in the punctured channels 355. Instead, the WLAN device would only modulate data using the unpunctured channels (the first channel 215 and the fourth channel 245).

To increase throughput, in accordance with this disclosure, a WLAN device may be able to transmit modulated data on portions of channels that do not interfere with the incumbent system transmission 305. For example, the frequency line graph 302 shows partial channel puncturing, in which data can be transmitted using a portion 327 of the second channel and a portion 337 of the third channel. Rather than puncturing the full channel, the WLAN device may only puncture transmissions on the frequencies which are in the Exclusion BW Zone 375. The Exclusion BW Zone 375 corresponds more closely to the frequencies used by the incumbent system transmission 305. To better illustrate partial channel puncturing, this disclosure will describe both full channel puncturing and partial channel puncturing for comparison purposes. It will be apparent that partial channel puncturing entails some enhancements that are not currently implemented in full channel puncturing technologies. Furthermore, a transmitting device (such as STA 120) can successfully transmit data to a receiving device (such as AP 110) using partial channel puncturing when both devices utilize the capability, configuration, and modulation techniques described in this disclosure.

Figure 4:
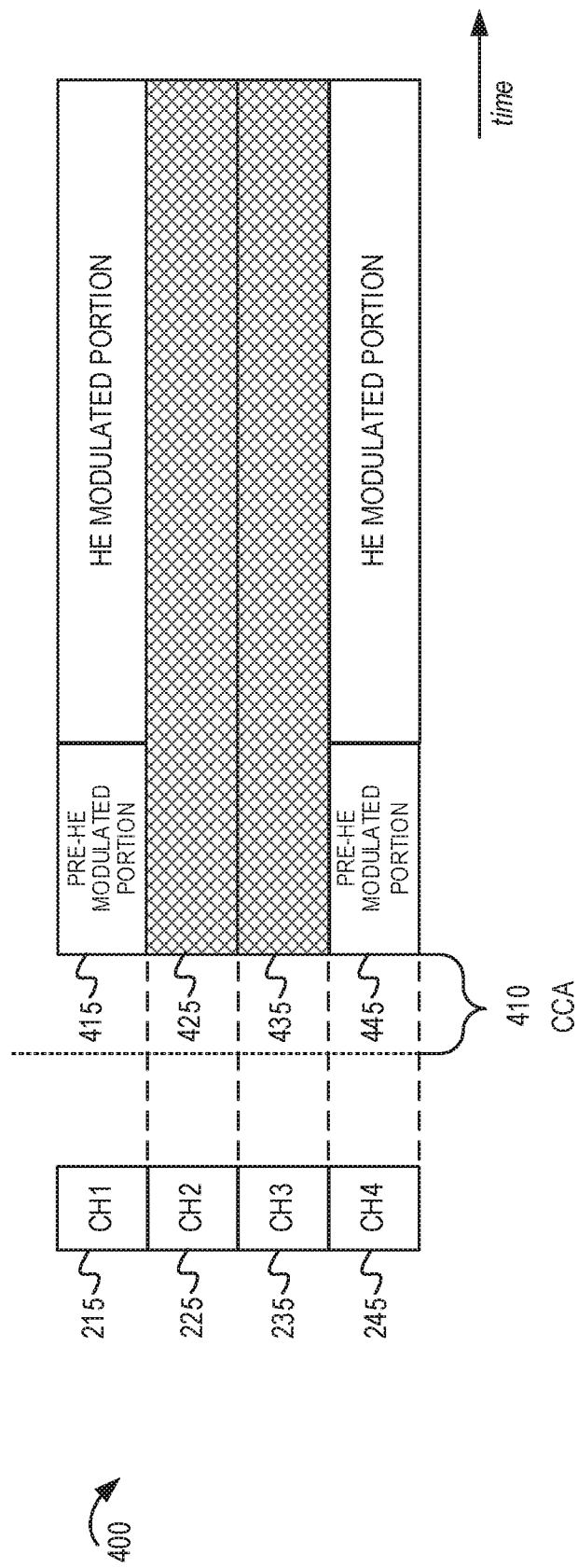
FIG. 4 depicts an example non-triggered transmission with full channel puncturing.

FIG. 4 depicts an example non-triggered transmission with full channel puncturing. Non-triggered transmissions refer to wireless communication that is unscheduled and is not caused by a previous transmission. In contrast, a triggered transmission occurs in response to an excitation frame (such as a trigger frame) which instructs the WLAN device to send a triggered transmission and which may be scheduled by a management entity (such as an AP of the WLAN). FIG. 4 shows a conceptual time-based illustration 400 of the transmissions that may be present on the first channel 215, the second channel 225, the third channel 235, and the fourth channel 245 in the channel group. Because non-triggered transmissions are not prompted (or triggered) by a previous transmission, typically a WLAN device would perform a clear channel assessment (CCA) 410 before sending the non-triggered transmission. The CCA 410 is a type of collision avoidance technique. Other types may be referred to as carrier sense, carrier detect, listen-before-talk, or the like. CCA is performed by a WLAN device to determine if the wireless communication medium (such as the group of channels) is available or busy (by another transmission). If the wireless communication medium is in use, the WLAN device may postpone transmission until the CCA is performed again and the wireless communication medium is not in use by another device.

In FIG. 4, there is an incumbent system transmission that occupies part of the second channel 225 and the third channel 235. Therefore, those channels are punctured. The full channel puncturing 425, 435 results in those channels being unused in the wireless transmission. The wireless communication signal is sent on the first channel 215 and the fourth channel 245. According to full channel puncturing techniques, a pre-HE modulated portion is duplicated and sent on every non-punctured channel. Thus, the transmission 415 on the first channel 215 and the transmission 445 on the fourth channel 245 may both begin with the same pre-HE modulated portion. The pre-HE modulated portion is used to prepare a recipient of the HE modulated portion to properly detect and decode the modulation of the HE modulated portion. The pre-HE modulated portion may include header fields (such as preamble, training signals, or other configuration signaling). When using full channel puncturing, the pre-HE modulated portion is duplicated for redundancy and to indicate to a receiver which channels are not punctured. Upon receiving the pre-HE modulated portion, the receiver will be configured to collect and demodulate the unduplicated HE modulated portion that is spread over the channels and which follows the duplicated pre-HE modulated portions on those channels. The HE modulated portion of the transmission is not duplicated but rather consists of data that is modulated across all the frequencies in the non-punctured channels.

Figure 5:
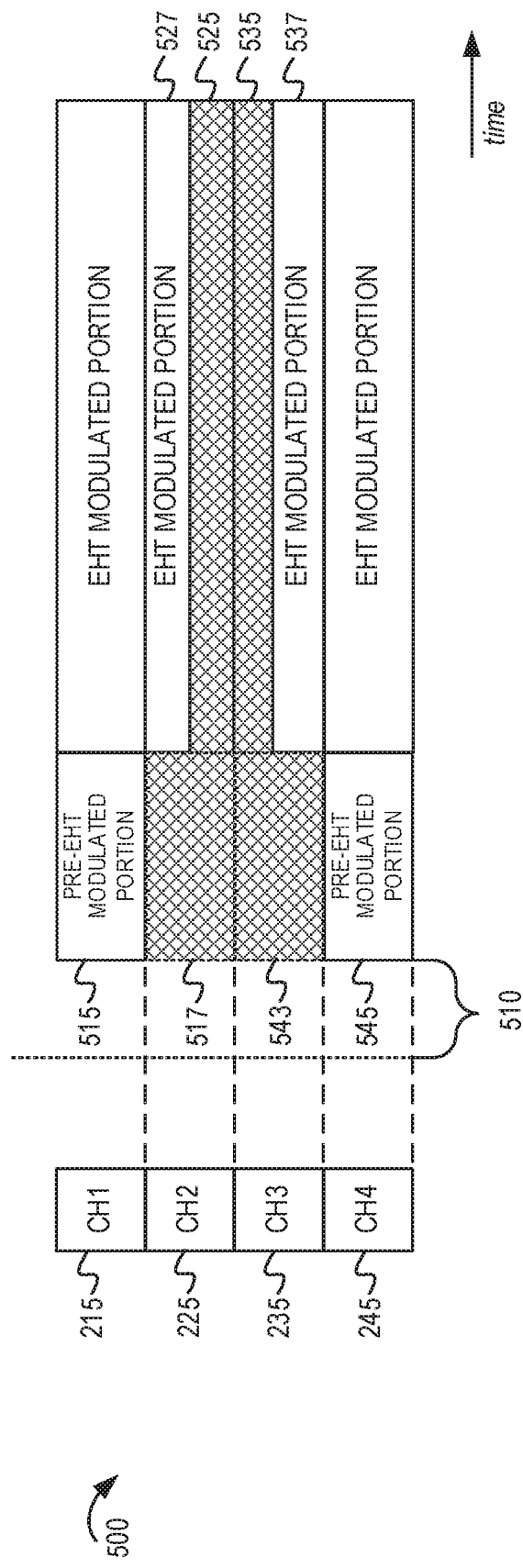
FIG. 5 depicts an example non-triggered transmission with partial channel puncturing with an Extremely High Throughput (EHT) transmission.
Figure 11:
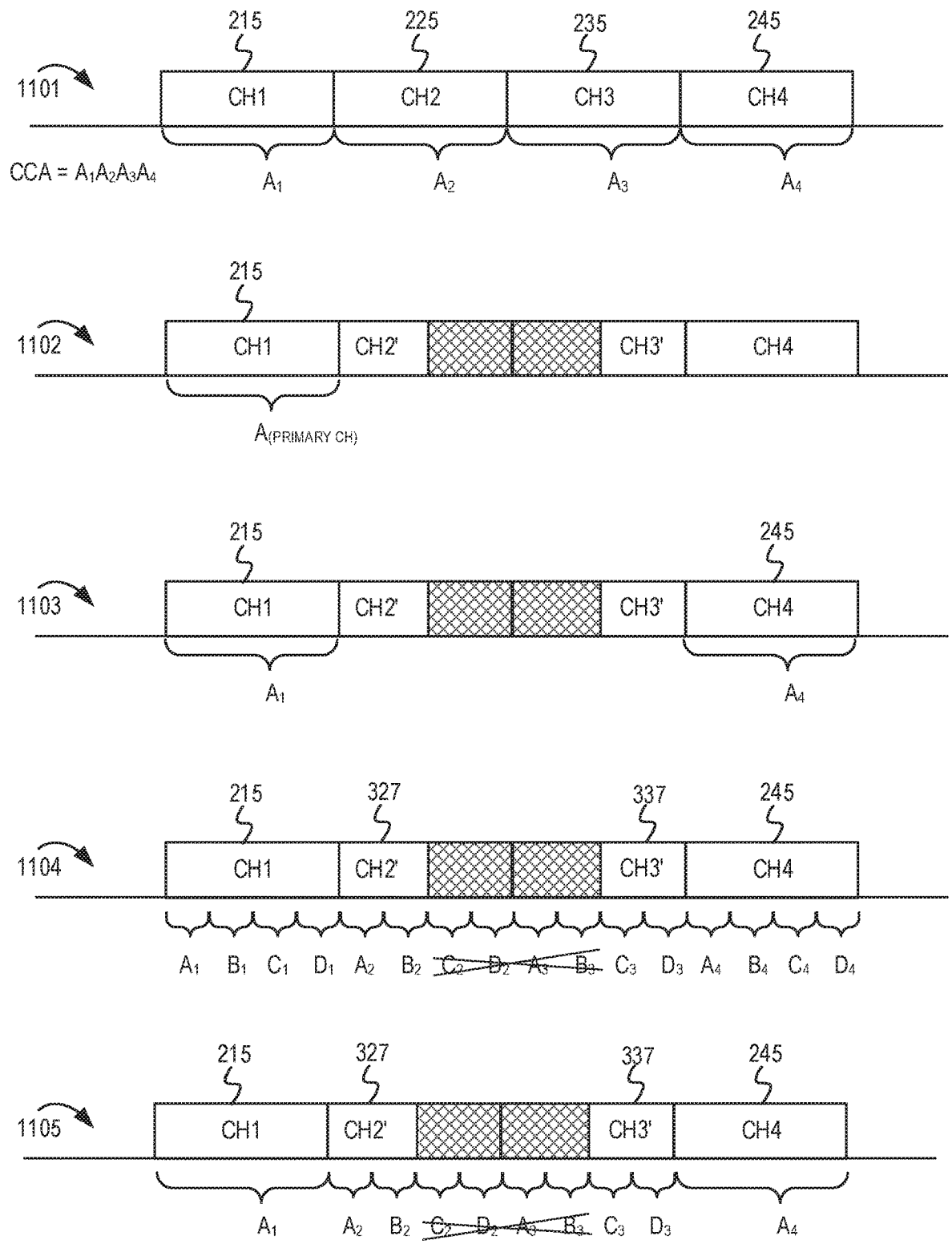
FIG. 11 depicts example options for clear channel assessment with partial channel puncturing.

FIG. 5 depicts an example non-triggered transmission with partial channel puncturing with an EHT transmission. FIG. 5 shows a conceptual time-based illustration 500 of the transmissions that may be present on the first channel 215, the second channel 225, the third channel 235, and the fourth channel 245 in the channel group. Similar to FIG. 4, before sending the non-triggered transmission, the WLAN device may perform a CCA 510 to determine that the wireless communication medium is available for transmission. FIG. 11 describes several options for CCA when using partial channel puncturing. For example, in some implementations, the CCA will ignore frequencies in the Exclusion BW Zone when determining whether the channel group is available. In some implementations, the CCA may be performed with finer granularity to on at least those channels which partially overlap the Exclusion BW Zone. Alternatively, the CCA may be performed using a neighboring channel (adjacent to the channel overlapping the Exclusion BW Zone) or a primary channel as an indicator for availability of the channel group. On the first channel 215, the transmission may include the pre-EHT modulated portion 515 followed by an EHT modulated portion. The pre-EHT modulated portion may include a preamble, training sequence, or other configuration data that informs a receiver how to decode the EHT modulated portion. Similarly, the fourth channel 245, the transmission may include the same (duplicate) pre-EHT modulated portion 545, followed by an EHT modulated portion. Because the second channel 225 and the third channel 235 overlap with the Exclusion BW Zone 525, 535, there may not be a preamble signaling on those channels. For example, the transmission may exclude (or puncture) the pre-EHT modulated portions (shown as omitted portions 517, 543) that would otherwise be included on the second channel 225 and third channel 235. However, different from the full channel puncturing example of FIG. 4, in FIG. 5 the non-punctured portions 527, 537 of the second channel 225 and third channel 235, respectively, are included when modulating the EHT modulated portion over the channel group. For the EHT modulated portion, only the frequency sub-ranges of the channels that are the Exclusion BW Zone 525, 535 are punctured.

When preparing the EHT modulated portion, the transmitting WLAN device modulates information across the frequencies in the first channel 215, the non-punctured portion 527 of the second channel 225, the non-punctured portion 537 of the third channel 235, and the fourth channel 245. A receiving WLAN device may receive the EHT modulated portion by sensing the corresponding channels (including the non-punctured portions 527, 537) even though there was not a duplicated pre-EHT modulated portion in the omitted portions 517, 543 of the second channel 225 and the third channel 235. Typically, the transmitting WLAN device and the receiving WLAN device would both be aware of the Exclusion BW Zone and could accommodate the Exclusion BW Zone while still making use of the remaining portions of channels. In some implementations, the Exclusion BW Zone is communicated using management frames (such a beacon frames, service configuration frames, or the like). By coordinating Exclusion BW Zone definitions between transmitting and receiving devices, those devices can utilize sub-channel puncturing even without the presence of the pre-EHT modulated portions on some channels.

Figure 6:
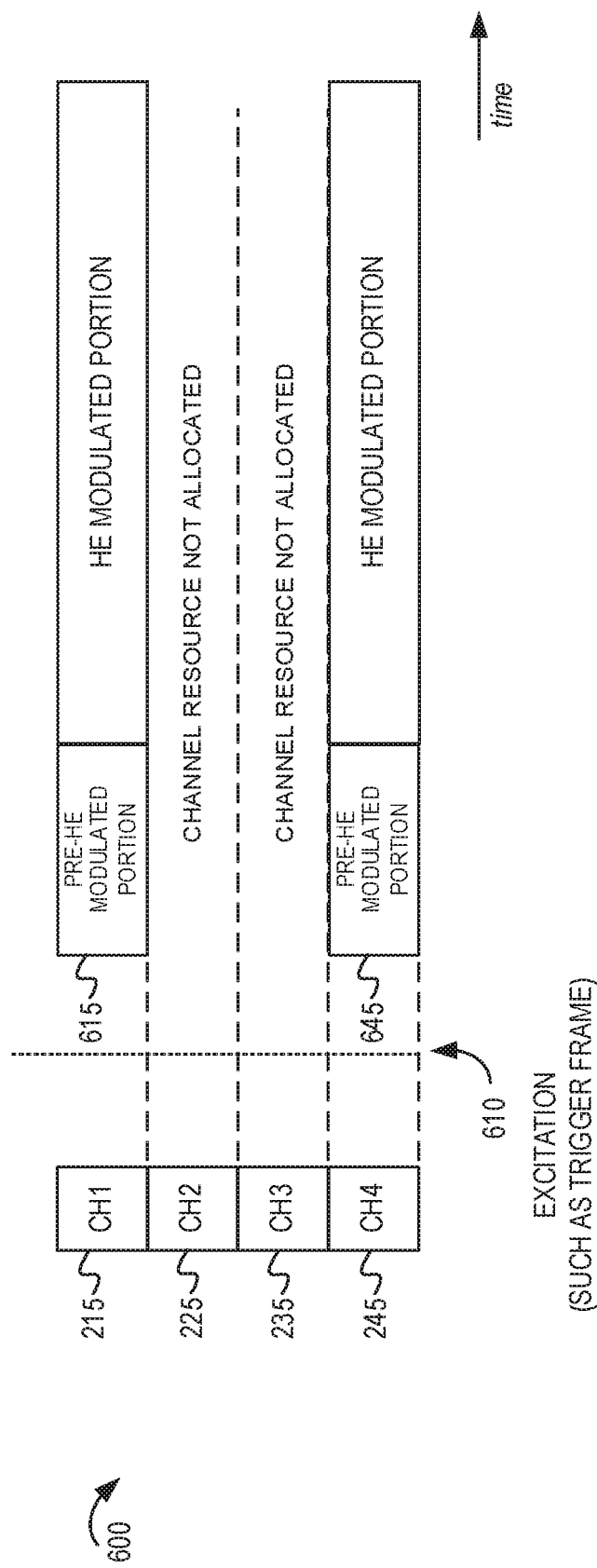
FIG. 6 depicts an example triggered transmission with full channel puncturing.

FIG. 6 depicts an example triggered transmission with full channel puncturing. A conceptual time-based illustration 600 shows the transmissions that may be present on the first channel 215, the second channel 225, the third channel 235 and the fourth channel 245 in the channel group. In the triggered scenario, an excitation 610 (such as a trigger frame or other previous transmission) causes a transmitting WLAN device to begin the triggered transmission. For example, an AP may send a trigger frame to the STA to prompt the STA to send the triggered transmission. The trigger frame also may indicate which channels are available for the STA to utilize. As shown in FIG. 6, the channel resource for the second channel 225 and the third channel 235 may not be allocated due to the presence of an incumbent system transmission. Thus, the WLAN transmitting device may only use the first channel 215 and the fourth channel 245. Similar to FIG. 4, the transmissions 615, 645, on those allocated channels may begin with a duplicated pre-HE modulated portion followed by the HE modulated portion. The HE modulated portion includes data that is modulated only on the frequencies associated with the allocated channels (the first channel 215 and the fourth channel 245).

Figure 7:
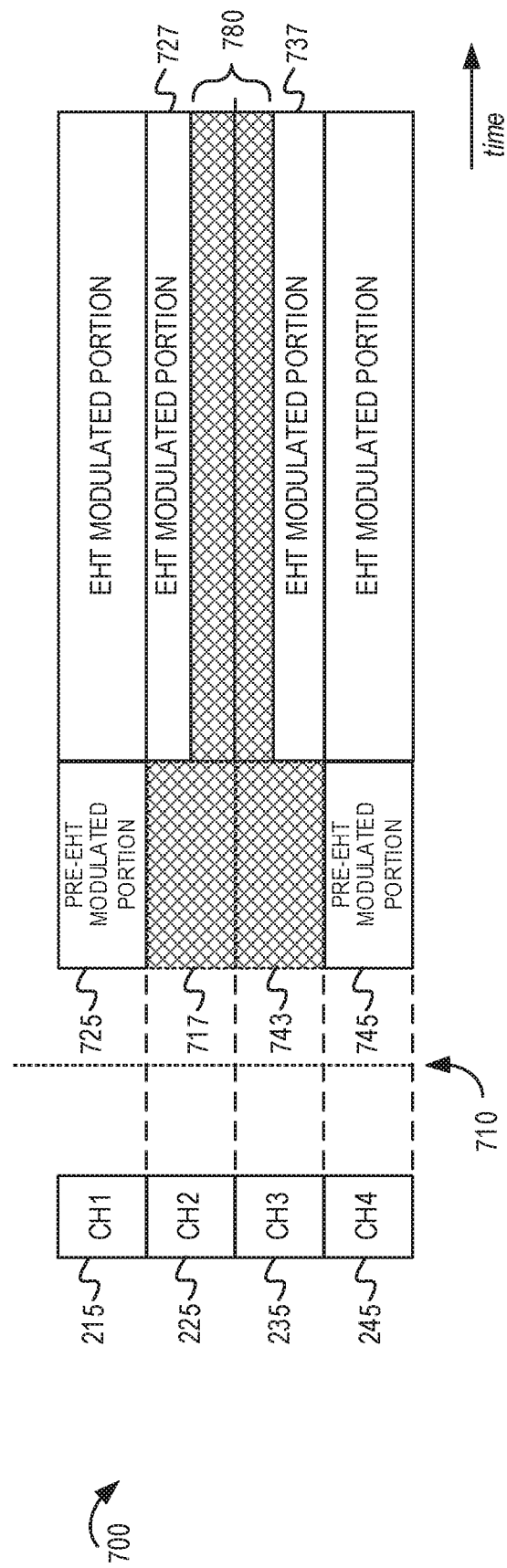
FIG. 7 depicts an example triggered transmission with partial channel puncturing using a pre-EHT modulated portion.

FIG. 7 depicts an example triggered transmission with partial channel puncturing using a pre-EHT modulated portion. The conceptual time-based illustration 700 shows the transmissions that may be present on the first channel 215, the second channel 225, the third channel 235 and the fourth channel 245 in the channel group. The triggered transmission is prompted by an excitation 710. The triggered transmission includes the duplicated pre-EHT modulated portion 725, 745 on the non-punctured channels (the first channel 215 and the fourth channel 245). The pre-EHT modulated portion may be omitted (shown as omitted portions 717, 743) may not be included on the channels that overlap part of the Exclusion BW Zone 780. Following the duplicated pre-EHT modulated portions 725, 745 and omitted portions 717, 743, the EHT modulated portion is modulated over all the frequencies of the non-punctured channels as well as the non-punctured portions 727, 737 of the second channel 225 and third channel 235, respectively. The Exclusion BW Zone 780 is unused in the EHT modulated portion.

Figure 8:
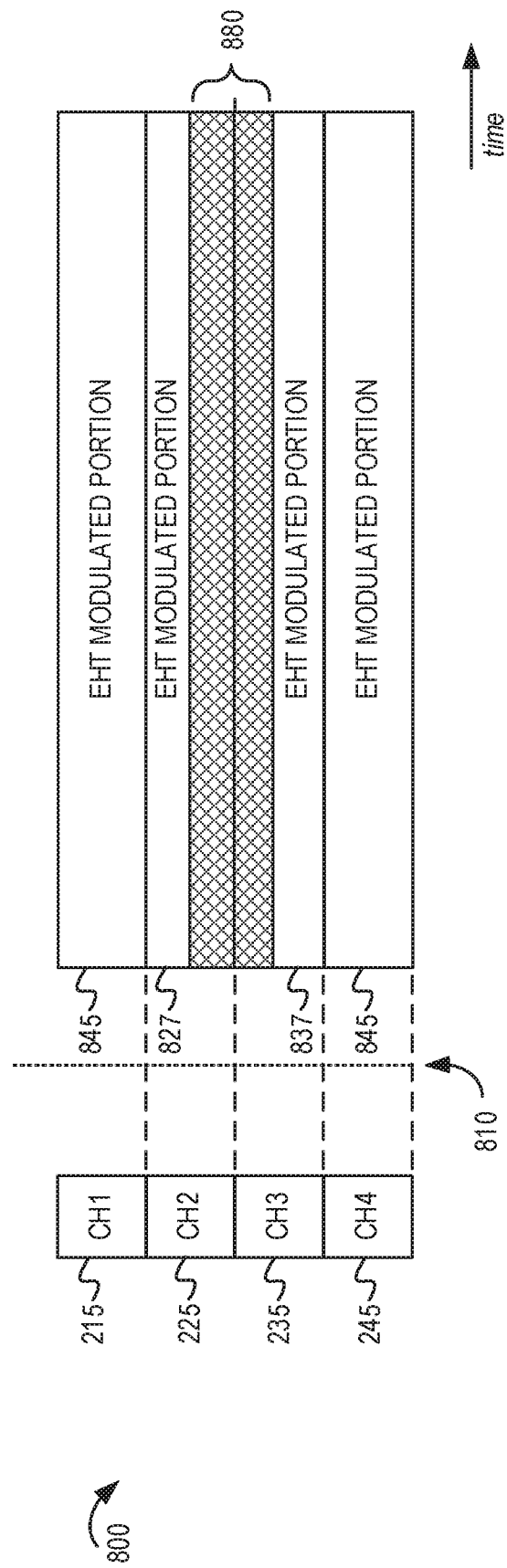
FIG. 8 depicts an example triggered transmission with partial channel puncturing without the pre-EHT modulated portion.

FIG. 8 depicts an example triggered transmission with partial channel puncturing without the pre-EHT modulated portion. FIG. 8 shows a conceptual time-based illustration 800 of the transmissions that may be present on the first channel 215, the second channel 225, the third channel 235, and the fourth channel 245 in the channel group. Similar to FIG. 7, the triggered transmission is prompted by an excitation 810 (such as a trigger frame). In the example of FIG. 8, the trigger frame may preclude the need for pre-EHT modulated portions. For example, the trigger frame may obviate some of the purposes of the pre-EHT modulated portion. The pre-EHT modulated portion may be used for timing synchronization and bootstrapping to the EHT (or HE) modulation settings. However, if the trigger frame can be used for timing synchronization and as an indicator of the modulation settings to be expected, then the pre-EHT modulated portion may be omitted. Thus, in FIG. 8, the triggered transmission does not include pre-EHT modulated portions on any of the channels. Rather, the triggered transmission can begin with EHT modulated portion (without the pre-EHT modulated portion). The EHT modulated portion is modulated across the frequencies of the first channel 215, the portion 827 of the second channel 225, the portion 837 of the third channel 235, and the fourth channel 245. The Exclusion BW Zone 880 is unused in the EHT modulated portion.

Figure 9:
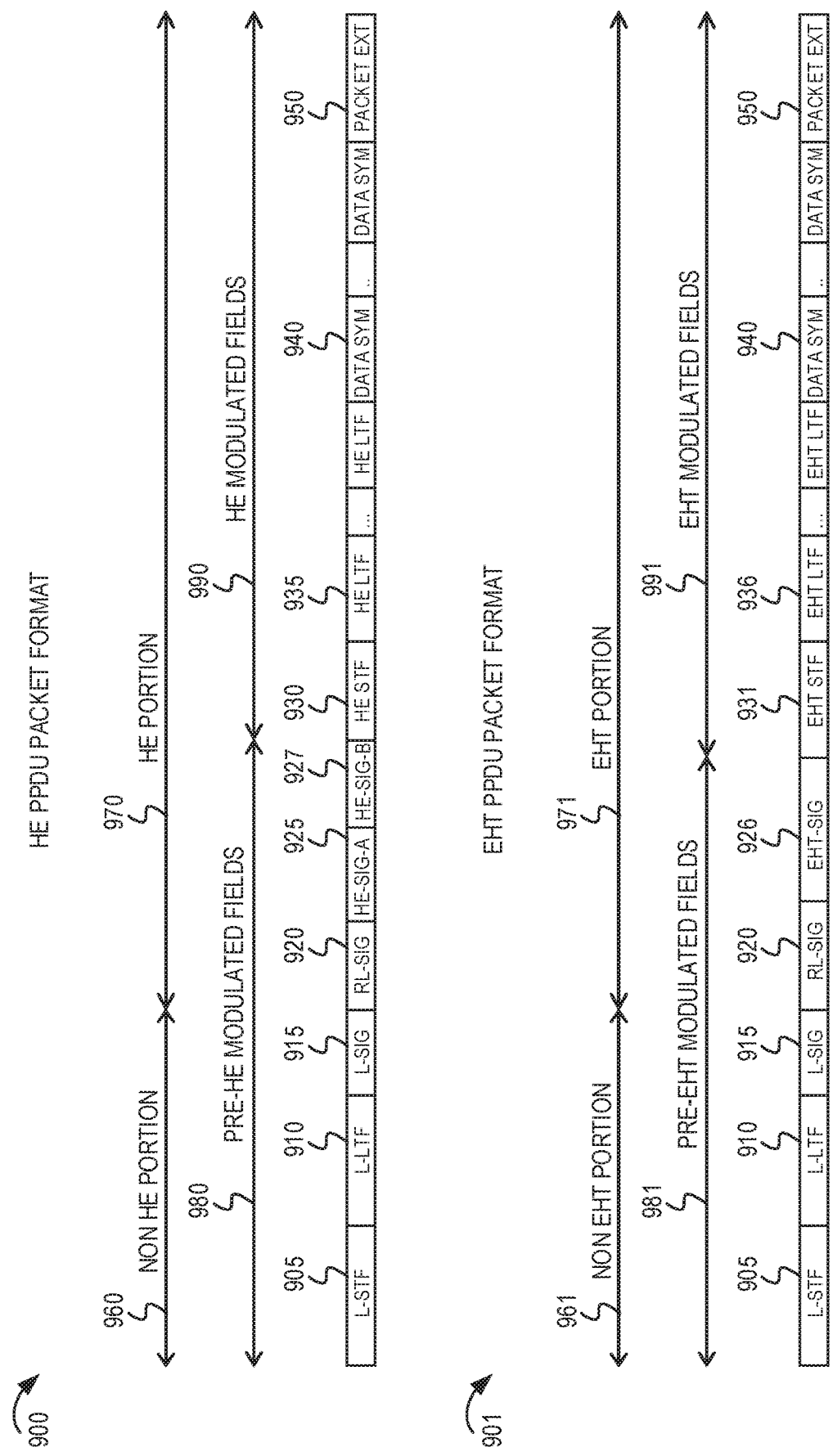
FIG. 9 depicts example packet formats for use with full channel puncturing or partial channel puncturing.

FIG. 9 depicts packet formats for use with full channel puncturing or partial channel puncturing. The HE packet format 900 (also referred to as a physical layer packet data unit, or HE PPDU) shows a non-HE portion 960. The non-HE portion 960 includes a legacy short training field 905 (L-STF), a legacy long training field 910 (L-LTF), and a legacy signal field 915 (L-SIG). The remaining portion of the PPDU is considered an HE modulated portion 970 because it includes features that are relevant to devices capable of HE transmissions. The pre-HE modulated fields 980 include the non-HE portion 960 as well as some fields to bootstrap the HE modulated fields 990. For example, the pre-HE modulated fields 980 may further include a repeated legacy signal field 920 (RL-SIG), a first HE signal field 925 (HE-SIG-A), and a second HE signal field 927 (HE-SIG-B). The repeated legacy signal field 920 and the HE signal field 925 may be modulated using a more reliable (robust) modulation than has lower throughput than the modulation scheme using for the HE modulated fields 990.

The HE modulated fields 990 includes an HE short training field 930 (HE STF), one or more symbols for an HE long training field 935 (HE LTF), one or more data symbols 940, and may include a packet extension field 950. The HE modulated fields 990 is modulated using inverse fast Fourier transform (IFFT) to convert the signal to orthogonal carrier transmissions in the time domain.

The EHT packet format 901 (or EHT PPDU) shows a non-EHT portion 961. The non-EHT portion 961 includes the legacy short training field 905 (L-STF), the legacy long training field 910 (L-LTF), and the legacy signal field 915 (L-SIG). The remaining portion of the PPDU is considered an EHT modulated portion 971 because it includes features that are relevant to devices capable of EHT transmissions. The pre-EHT modulated field 981 include the non-EHT portion 961 as well as some fields to bootstrap the EHT modulated fields 991. For example, the pre-EHT modulated field 981 also includes a repeated legacy signal field 920 (RL-SIG) and an EHT signal field 926 (EHT-SIG). The repeated legacy signal field 920 and the EHT signal field 926 may be modulated using a more reliable (robust) modulation than has lower throughput than the modulation scheme using for the EHT modulated fields 991. In the example of FIG. 8, the pre-EHT modulated fields 981 may be omitted if both the transmitting and receiving devices do not need the pre-EHT modulated fields 981 to properly convey the EHT modulated fields 991.

The EHT modulated fields 991 include an EHT short training field 931 (EHT STF), one or more symbols for an EHT long training field 936 (EHT LTF), one or more data symbols 940, and may include a packet extension field 950. The EHT modulated fields 991 is modulated using inverse fast Fourier transform (IFFT) to convert the signal to orthogonal carrier transmissions in the time domain. During the IFFT phase, the EHT modulated fields 991 may be modulated across all the frequencies (including available frequencies not overlapping the Exclusion BW Zone in the non-punctured portions of channels).

Figure 10:
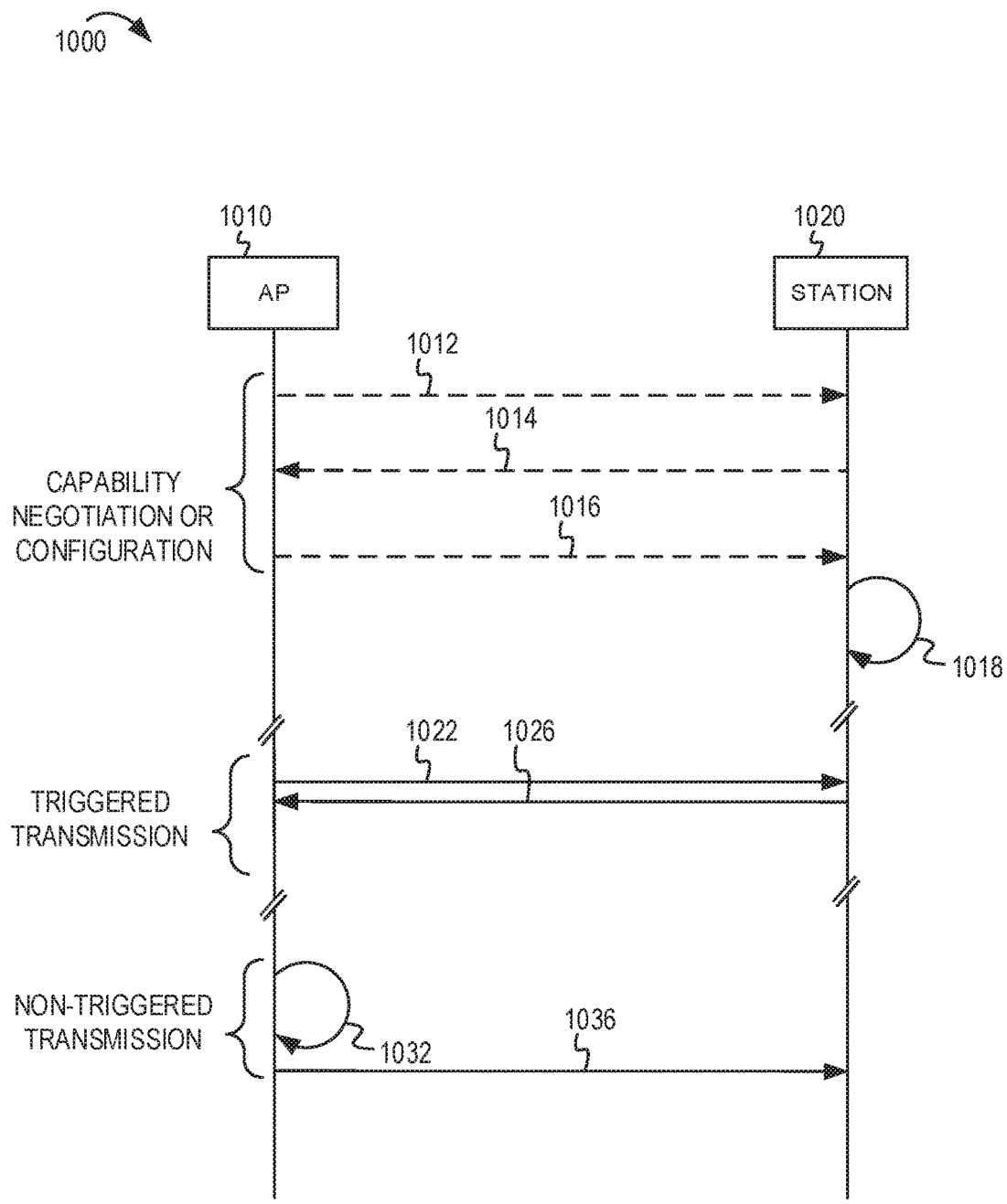
FIG. 10 depicts a message flow diagram with an example of a configuration phase, a triggered transmission, and a non-triggered transmission.

FIG. 10 depicts a message flow diagram with an example of a configuration phase, a triggered transmission, and a non-triggered transmission. The message flow diagram 1000 shows some example communications between two WLAN apparatuses (an AP 1010 and a STA 1020).

The first example communication includes a capability negotiation or configuration phase. For example, the AP 1010 may send a first message 1012 that includes an indicator that the AP 1010 supports communication using partial channel puncturing. For example, a beacon frame or other management frame may include a service set capabilities field for indicating various capabilities of the AP 1010. The AP 1010 may advertise the capability using a pre-defined capability field (such as a "Sub-20 MHz puncturing" indicator or a "partial channel puncturing" indicator). Similarly, the STA 1020 may indicate its support for partial channel puncturing. The message flow diagram 1000 shows a second message 1014 from the STA 1020 to the AP 1010. The second message 1014 may include a capability indicator to indicate that the STA 1020 supports partial channel puncturing. In some implementations, the second message 1014 may be an association or registration message. Alternatively, if the AP 1010 has not previously indicated its support for partial channel puncturing, the second message 1014 may be a service request to initiate a partial channel puncturing relationship with the AP 1010. At a third message 1016, the AP 1010 may confirm that partial channel puncturing is enabled for the association. The third message 1016 also may include an Exclusion BW Zone list so that both the AP 1010 and the STA 1020 use the same Exclusion BW Zone list for transmitting and receiving partial channel punctured transmissions. Alternatively, the Exclusion BW Zone list may be distributed by the AP 1010 to multiple stations (not shown) in the WLAN to facilitate uniform agreement among all stations in the WLAN that send or receive partial channel punctured transmissions.

In a second example communication shown in FIG. 10, a triggered transmission is illustrated. The AP 1010 may send a trigger frame 1022 to the STA 1020. The trigger frame 1022 may prompt the STA 1020 to send the triggered transmission (such as those described in FIGS. 7 and 8).

In a third example communication shown in FIG. 10, a non-triggered transmission is illustrated. The AP 1010 may determine to send a non-triggered transmission 1036 (such as a downlink communication) to the STA 1020. Before transmitting the non-triggered transmission 1036, the AP 1010 may perform a clear channel assessment 1032 to determine that the wireless communication medium is available for use. FIG. 11 describes several techniques for clear channel assessment which may be used when partial channel puncturing is enabled.

FIG. 11 depicts example options for clear channel assessment with partial channel puncturing. CCA is a mechanism used in IEEE 802.11 networks to determine if a wireless communication medium is available for use. CCA may include carrier sense and energy detection. Carrier sense (CS) refers to a radio interface listening for, detecting, and decoding an incoming packet preamble. Energy detection (ED) refers to the ability of a radio interface to detect the energy level present on a channel (or frequency range) based on the noise floor, ambient energy, interference sources, and unidentifiable WLAN transmissions that may have been corrupted but can no longer be decoded. The radio interface may compare detected energy on a channel (or frequency range) to an ED threshold to assess whether another transmitter is using the channel (or frequency range). Using both CS and ED, the CCA procedure can determine whether the channel (or frequency range) is idle (also referred to as being available) or is being used by another transmitter. In some implementations, the CCA is performed by a physical layer of a WLAN radio interface.

For comparison purposes, FIG. 11 includes an illustration 1101 of CCA when no puncturing is needed for a channel group. In the illustration 1101, the radio interface may perform CS and ED for each of the four channels in the group (the first channel 215, the second channel 225, the third channel 235, and the fourth channel 245). A first energy measurement $A_1$ is performed for the first channel 215, a second energy measurement $A_2$ is performed for the second channel 225, a third energy measurement $A_3$ is performed for the third channel 235, and a fourth energy measurement $A_4$ is performed for the fourth channel 245. The CCA may determine that the channel group is idle (thus available for a transmission) if all of the energy measurements $A_1, A_2, A_3$, and $A_4$ are below an ED threshold. In some implementations, the energy measurements may be combined to form a bitmap that is passed to a higher layer (above the PHY layer) of the radio interface. In the illustration 1101, the bitmap would only be four bits since there was one CCA measurement for each of the four channels.

When partial channel puncturing is used, there may be several alternative options for a WLAN transmitting device to determine whether the channel group is available for use. In each of the options, the WLAN transmitting device would refrain from using CCA measurements on frequencies that overlap an Exclusion BW Zone.

In a first option 1102, a transmitting WLAN device may use CCA for only a primary channel within the channel group. When the channel group is allocated by the AP, a primary channel may be assigned. The AP would assign a primary channel that does not overlap with an Exclusion BW Zone. In the first option 1102, the channel allocation for a geographic area may be managed such that the WLAN devices can rely on the primary channel without including the secondary channels in the CCA measurements. For example, if no other devices or WLANs in the area are using the second channel 225, the third channel 235, and the fourth channel 245 without also using the first channel 215, then the CCA measurement on the primary channel (the first channel 215) would be indicative of idle or busy status for the whole group of channels.

In a second option 1103, the transmitting WLAN device may perform CCA on channels that are adjacent to the channels that overlap the Exclusion BW Zone, but would not include CCA measurements for the channel that overlap the Exclusion BW Zone. For example, the transmitting WLAN device may use CCA measurements $A_1$ and $A_4$ for the first channel 215 and the fourth channel 245, respectively. But in this option, the transmitting WLAN device may not include the CCA measurements (not shown) for the second channel 225 or the third channel 235 since portions of those channels overlap the Exclusion BW Zone.

In a third option 1104, the transmitting WLAN device may use an enhanced CCA procedure that measures portions of channels, rather than the whole channel. For example, the CCA may use ED on smaller sections of bandwidth (such as 5 MHz or 10 MHz) instead of the full channel bandwidth (20 MHz) for each channel. In the example shown in the third option 1104, the CCA measurement width ($R_{BW}$) is 5 MHz. Since each channel is 20 MHz wide, there would be 4 measurements for each channel. The measurements $A_1$, $B_1$, $C_1$, and $D_1$ are taken for the first channel 215. For the second channel 225, the measurements ($A_2$ and $B_2$) for those segments that do not overlap the Exclusion BW Zone would be used. The other measurements ($C_2$ and $D_2$) either would not be measured or would be discarded in the CCA determination. Similarly, for the third channel 235, the measurements ($C_3$ and $D_3$) for those segments that do not overlap the Exclusion BW Zone would be used. In this implementation, the bitmap that represents the CCA measurements would grow when the segment size is decreased. For more granular CCA measurements, the CCA bitmap may become larger.

The fourth option 1105 provides a hybrid option between the second option 1103 and the third option 1104. For those channels (such as the first channel 215 and the fourth channel 245) that do not overlap an Exclusion BW Zone, the CCA could be based on the full channel CS and ED measurements. For those channels (such as the second channel 225 and the third channel 235) that have portions that overlap the Exclusion BW Zone, the CCA could use smaller segments of those channels to determine ED in the usable portions 327, 337 that do not overlap the Exclusion BW Zone.

Figure 12:
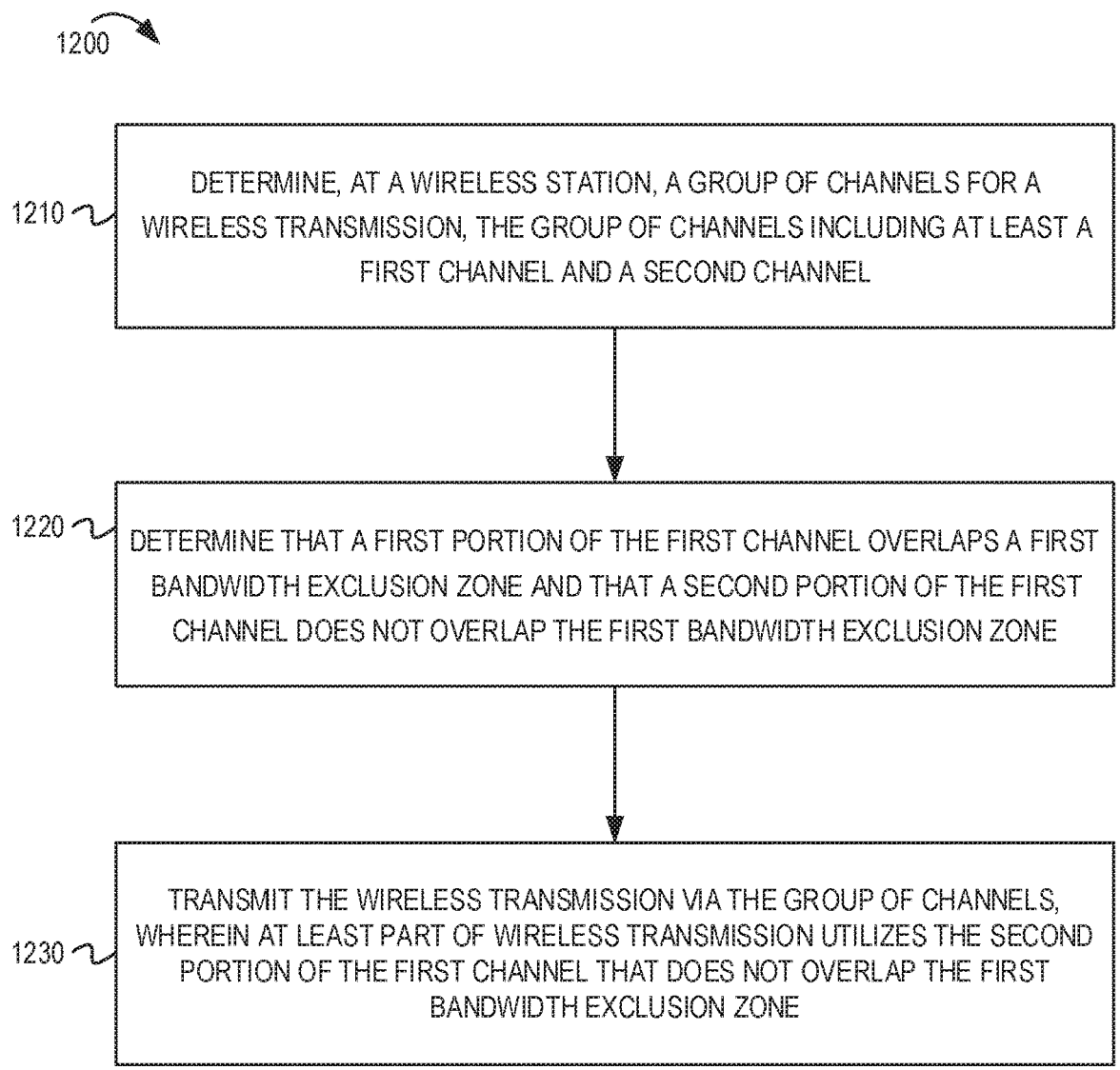
FIG. 12 depicts a flowchart with an example of a partial channel puncturing.

FIG. 12 depicts a flowchart for a partial channel puncturing. The flowchart 1200 begins at block 1210.

At block 1210, a WLAN device may determine a group of channels for a wireless transmission. The group of channels may include at least a first channel and a second channel. In some implementations, the group of channels may be allocated by an AP to form a larger logical channel for high throughput transmissions. For example, the WLAN device may combine four 20 MHz channels to form an 80 MHz bandwidth-wide group of channels.

At block 1220, the WLAN device may determine that a first portion of the first channel overlaps a first bandwidth exclusion zone and that a second portion of the first channel does not overlap the first bandwidth exclusion zone. For example, the WLAN device may compare the frequency ranges of the channels in the group of channels with an Exclusion BW Zone list. In some implementations, the Exclusion BW Zone list may be received or obtained from an AP of the WLAN.

At block 1230, the WLAN device may transmit the wireless transmission via the group of channels. At least part of wireless transmission utilizes the second portion of the first channel that does not overlap the first bandwidth exclusion zone. The WLAN device may use partial channel puncturing to remove frequencies that overlap the first bandwidth exclusion zone from the wireless transmission. If there are multiple Exclusion BW Zones in the group of channels, the WLAN device may use partial channel puncturing for any channel which partially overlaps with one of the Exclusion BW Zones.

Figure 13:
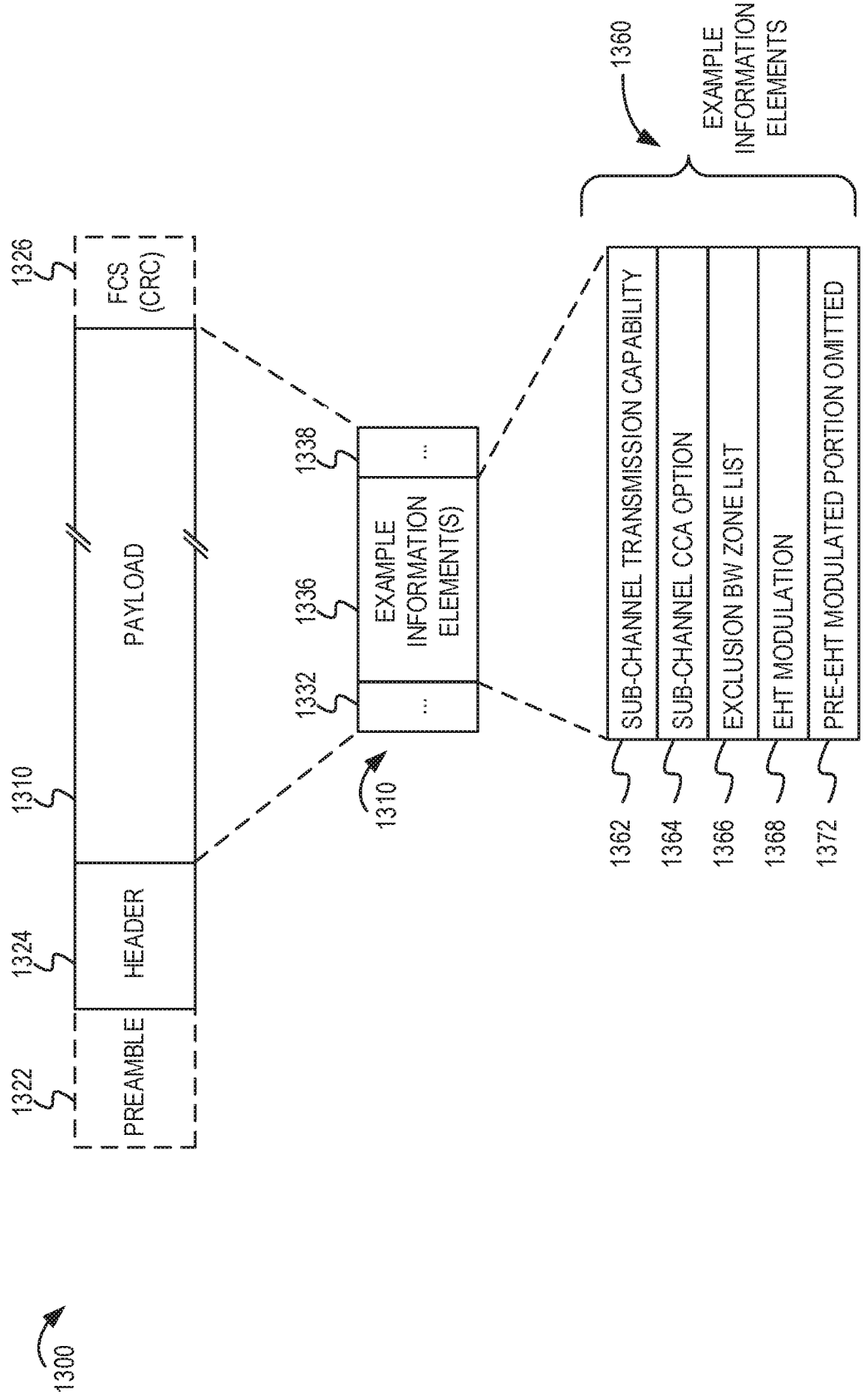
FIG. 13 depicts a conceptual diagram of an example management frame.

FIG. 13 depicts a conceptual diagram of an example management frame. For example, the example management frame 1301 may be sent from an AP to a STA or from a STA to an AP. In some implementations, the management frame 1301 may include or be included in a configuration message. The management frame 1301 may be defined by the IEEE 802.11 specification for configuring a WLAN or for establishing an association. In some implementations, the management frame 1301 may be a legacy management frame that is modified or extended to include capability or configuration information to support partial channel puncturing. In some other implementations, the management frame 1301 may be a new management frame created to facilitate partial channel puncturing between two WLAN devices. One example of the management frame 1301 may include an enhanced beacon frame that may be used by IEEE 802.11 (similar to the beacon frames defined for IEEE 802.11ax). Another example of a management frame 1301 may be a synchronization frame or other short frame that may be defined for other technologies (or next generation of IEEE 802.11, beyond 802.11ax).

The example management frame 1301 may include a header 1324 and a payload 1310. In some implementations, the header 1324 may include source addresses (such as the network address of the sending AP), the length of data frame, or other frame control information. The payload 1310 may be used to convey the partial channel puncturing capability or configuration information. The partial channel puncturing capability or configuration information may be organized or formatted in a variety of ways.

In some implementations, the example management frame 1303 may include a preamble 1322. The preamble 1322 may be used, for example, when the transmission is non-triggered or non-scheduled. In some implementations, the preamble may be omitted for triggered or scheduled transmissions. When the preamble is present, the preamble 1322 may include one or more bits to establish synchronization. The example management frame 1301 may include an optional frame check sequence (FSC) 1326. The payload 1311 may be organized with a message format and may include information elements 1332, 1336, and 1338.

Several examples of information elements 1360 are illustrated in FIG. 13. The information elements 1360 may include a sub-channel transmission capability indicator 1362 (which also may be referred to as a partial channel puncturing indicator or a sub-20 MHz transmission indicator). The sub-channel transmission capability indicator 1362 may be used to indicate whether the WLAN device supports the partial channel puncturing features in this disclosure. The information elements 1360 may include a sub-channel CCA option indicator 1364, which can indicate which CCA option the WLAN device will utilize to determine that the channel group is available. The information elements 1360 may include an Exclusion BW Zone List 1366 which the WLAN device will use for determining which frequencies to exclude when performing partial channel puncturing. The information elements 1360 may include an EHT Modulation indicator field 1368 to indicate the type of modulation that will be used in the EHT modulated portion. The information elements 1360 may include a field to indicate whether a pre-EHT modulated portion will be included or omitted on triggered transmissions 1372.

Figure 14:
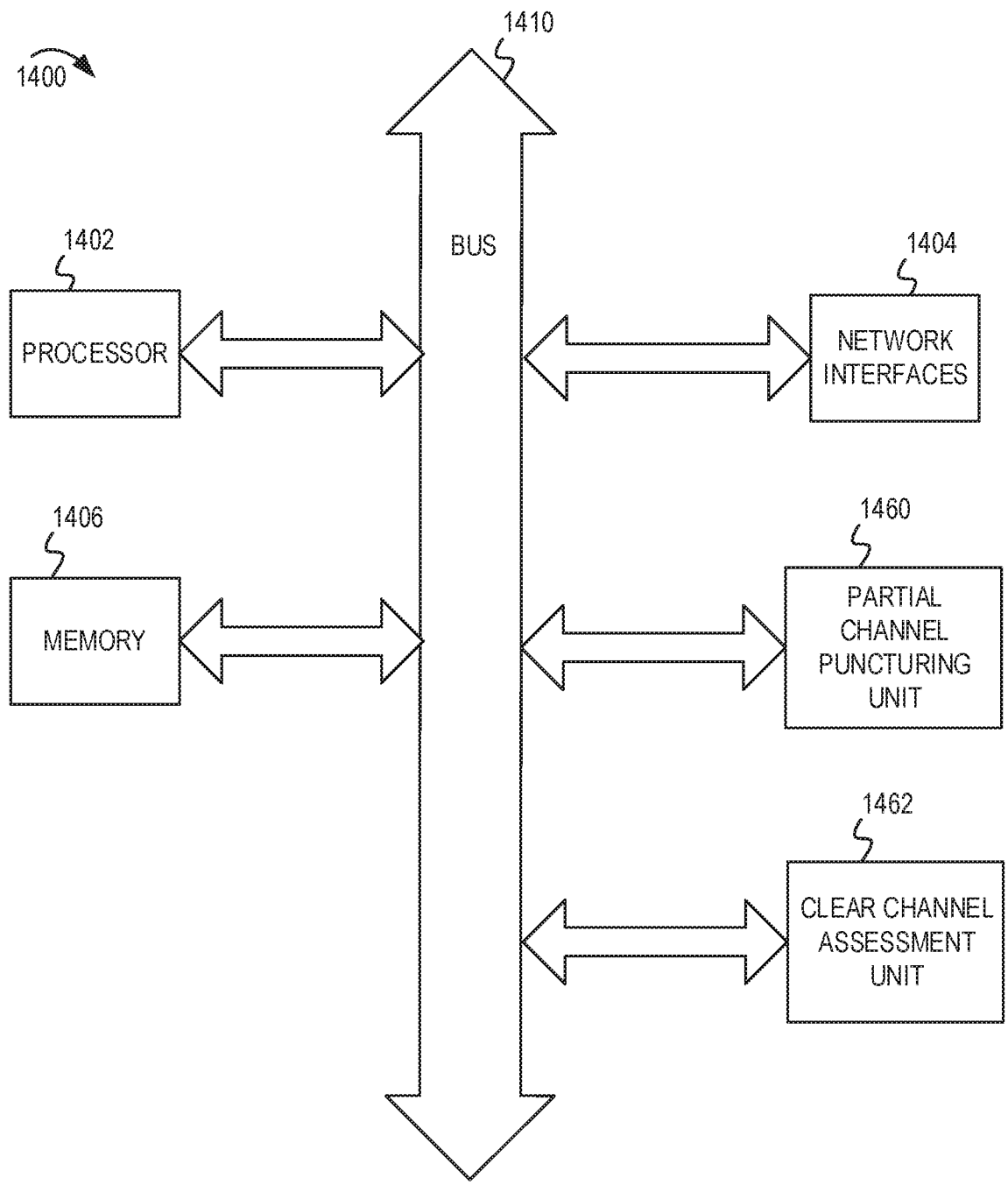
FIG. 14 shows a block diagram of an example electronic device for implementing aspects of this disclosure.

FIG. 14 shows a block diagram of an example electronic device for implementing aspects of this disclosure. In some implementations, the electronic device 1400 may be a WLAN apparatus, such as an access point (including any of the APs described herein), a range extender, a wireless station (including any of the STAs described herein) or other electronic systems. The electronic device 1400 can include a processor unit 1402 (possibly including multiple processors, multiple cores, multiple nodes, or implementing multi-threading, etc.). The electronic device 1400 also can include a memory unit 1406. The memory unit 1406 may be system memory or any one or more of the possible realizations of computer-readable media described herein. The electronic device 1400 also can include a bus 1410 (such as PCI, ISA, PCI-Express, HyperTransport®, InfiniBand®, NuBus® AHB, AXI, etc.), and a network interface 1404 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 1400 may support multiple network interfaces—each of which is configured to couple the electronic device 1400 to a different communication network.

The electronic device 1400 may include a partial channel puncturing unit 1460 and a clear channel assessment unit 1462. In some implementations, the partial channel puncturing unit 1460 or the clear channel assessment unit 1462 can be distributed within the processor unit 1402, the memory unit 1406, and the bus 1410. The partial channel puncturing unit 1460 and the clear channel assessment unit 1462 can perform some or all of the operations described herein. For example, the partial channel puncturing unit 1460 may maintain the Exclusion BW Zone list. The partial channel puncturing unit 1460 may coordinate with an IFFT or FFT block of a radio transmitter to perform puncturing when transmitting or to decode received partial channel punctured transmissions. The clear channel assessment unit 1462 may perform one or more of the CCA options described in FIG. 11.

The memory unit 1406 can include computer instructions executable by the processor unit 1402 to implement the functionality of the implementations described in FIGS. 1-13. Any of these functionalities may be partially (or entirely) implemented in hardware or on the processor unit 1402. For example, the functionality may be implemented with an application specific integrated circuit, in logic implemented in the processor unit 1402, in a co-processor on a peripheral device or card, etc. Further, realizations may include fewer or additional components not illustrated in FIG. 14 (such as video cards, audio cards, additional network interfaces, peripheral devices, etc.). The processor unit 1402, the memory unit 1406, and the network interface 1404 are coupled to the bus 1410. Although illustrated as being coupled to the bus 1410, the memory unit 1406 may be coupled to the processor unit 1402.

In some implementations, the electronic device 1400 can be an example of an apparatus for use in a WLAN apparatus such as AP 110, STA 120, AP 1010, STA 1020, or the like. For example, the electronic device 1400 can be a chip, system on chip (SoC) or chipset that includes one or more interfaces (for example, a Wi-Fi (IEEE 802.11) modem or a cellular modem). In other instances, the electronic device 1400 can be a STA or AP that includes such a chip, SoC or chipset as well as at least one transceiver and at least one antenna.

FIGS. 1-14 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray' disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by a wireless local area network (WLAN) apparatus, the method comprising:
   generating a packet for transmission via a wireless channel, wherein generating the packet includes using partial channel puncturing to omit transmission signals at a first sub-20 MHz portion of the wireless channel that overlaps a first bandwidth exclusion zone; and
   transmitting the packet via the wireless channel, wherein at least part of the packet utilizes transmission signals at a second sub-20 MHz portion of the wireless channel that does not overlap the first bandwidth exclusion zone.

2. The method of claim 1, wherein transmitting the packet includes transmitting transmission signals that occupy non-excluded portions of the wireless channel.

3. The method of claim 1, further comprising, before transmitting the packet:
   receiving a bandwidth exclusion zone list that includes at least the first bandwidth exclusion zone from an access point of a wireless network.

4. The method of claim 1, further comprising:
   receiving, from a second WLAN apparatus, a capability indicator that indicates that the second WLAN apparatus supports the partial channel puncturing; and
   using the partial channel puncturing when the capability indicator indicates that the second WLAN apparatus supports the partial channel puncturing.

5. The method of claim 1, further comprising:
   performing a clear channel assessment before transmitting the packet, wherein the clear channel assessment is based on a first amount of detected energy at a primary subchannel of the wireless channel.

6. The method of claim 5, wherein the primary subchannel is selected in coordination with a recipient of the packet, and wherein the primary subchannel does not overlap with any bandwidth exclusion zones.

7. The method of claim 1, further comprising:
   performing a clear channel assessment before transmitting the packet, wherein the clear channel assessment is based on one or more amounts of detected energy on a per-channel basis for a set of subchannels of the wireless channel, the set of subchannels including subchannels that do not overlap with any bandwidth exclusion zones.

8. The method of claim 7, wherein the set of subchannels includes at least one adjacent subchannel next to a first subchannel having the first sub-20 MHz portion that overlaps the first bandwidth exclusion zone.

9. The method of claim 1, further comprising:
   performing a clear channel assessment before transmitting the packet, wherein the clear channel assessment is based, at least in part, on one or more amounts of detected energy measured in the second sub-20 MHz portion of the wireless channel.

10. The method of claim 1, further comprising:
using partial channel puncturing to omit transmission signals at all sub-20 MHz portions of the wireless channel that overlap one or more bandwidth exclusion zones.

11. The method of claim 1, wherein the wireless transmission includes a pre-Extremely High Throughput (pre-EHT) modulated preamble on one or more 20 MHz subchannels in the wireless channel, the method further comprising omitting the pre-EHT modulated preamble from a 20 MHz subchannel that includes the first sub-20 MHz portion.

12. A wireless local area network (WLAN) apparatus, comprising:
an interface; and
a processor configured to:
generate a packet for transmission via a wireless channel, wherein the processor is configured to use partial channel puncturing to omit transmission signals at a first sub-20 MHz portion of the wireless channel that overlaps a first bandwidth exclusion zone, and
cause the interface to transmit the packet via the wireless channel, wherein at least part of the packet utilizes transmission signals at a second sub-20 MHz portion of the wireless channel that does not overlap the first bandwidth exclusion zone.

13. The WLAN apparatus of claim 12, wherein the processor is configured to cause the interface to transmit the packet including transmission signals that occupy non-excluded portions of wireless channel.

14. The WLAN apparatus of claim 12, wherein the processor is configured to, before causing the interface to transmit the packet:
receive a bandwidth exclusion zone list that includes at least the first bandwidth exclusion zone from an access point of a wireless network.

15. The WLAN apparatus of claim 12,
wherein the interface is configured to obtain, from a second WLAN apparatus, a capability indicator that indicates that the second WLAN apparatus supports the partial channel puncturing; and
wherein the processor is configured to use the partial channel puncturing when the capability indicator indicates that the second WLAN apparatus supports the partial channel puncturing.

16. The WLAN apparatus of claim 12, wherein the processor is configured to use partial channel puncturing to omit transmission signals at all sub-20 MHz portions of the wireless channel that overlap one or more bandwidth exclusion.

17. The WLAN apparatus of claim 12, further comprising:
one or more antennas coupled to the at least one interface to wirelessly transmit signals output from the interface and to wirelessly receive signals for input into the interface; and
a housing that encompasses the processor and at least a portion of the one or more antennas.

18. A method for wireless communication by a wireless local area network (WLAN) apparatus, the method comprising:
performing a clear channel assessment of a wireless communication medium that includes a group of 20 MHz subchannels, wherein a first sub-20 MHz portion of a first subchannel of the group of 20 MHz subchannels overlaps a first bandwidth exclusion zone and a second sub-20 MHz portion of the first subchannel does not overlap the first bandwidth exclusion zone, the clear channel assessment based, at least in part, on a detected energy at a frequency of the second sub-20 MHz portion of the first subchannel; and
transmitting a packet via the wireless communication medium based on the clear channel assessment, the packet including transmission signals on at least the second sub-20 MHz portion of the first subchannel and transmission signals on the first sub-20 MHz portion of the first subchannel.

19. The method of claim 18, further comprising:
using partial channel puncturing to omit the transmission signals on the first sub-20 MHz portion.

20. The method of claim 19, further comprising:
receiving, from a second WLAN apparatus, a capability indicator that indicates that the second WLAN apparatus supports the partial channel puncturing; and
using the partial channel puncturing when the capability indicator indicates that the second WLAN apparatus supports the partial channel puncturing.

* * * * *